Figure 1A:
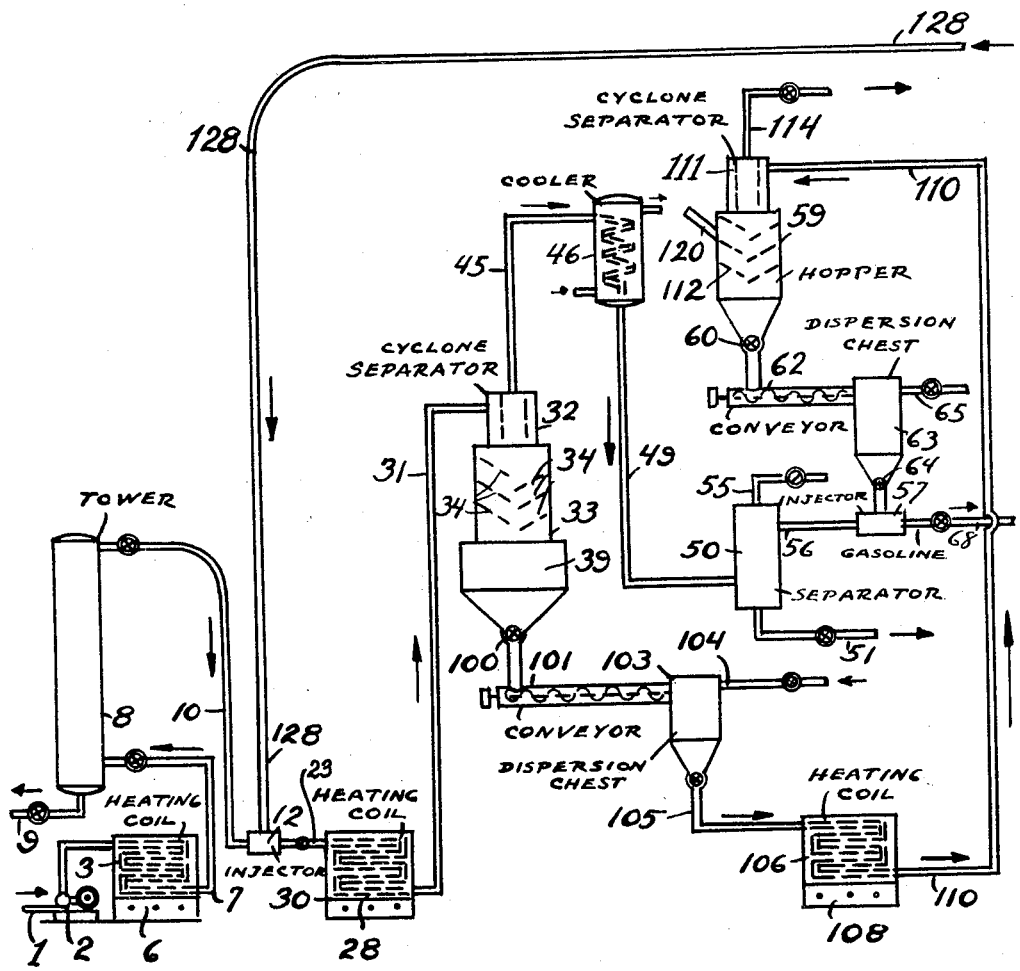

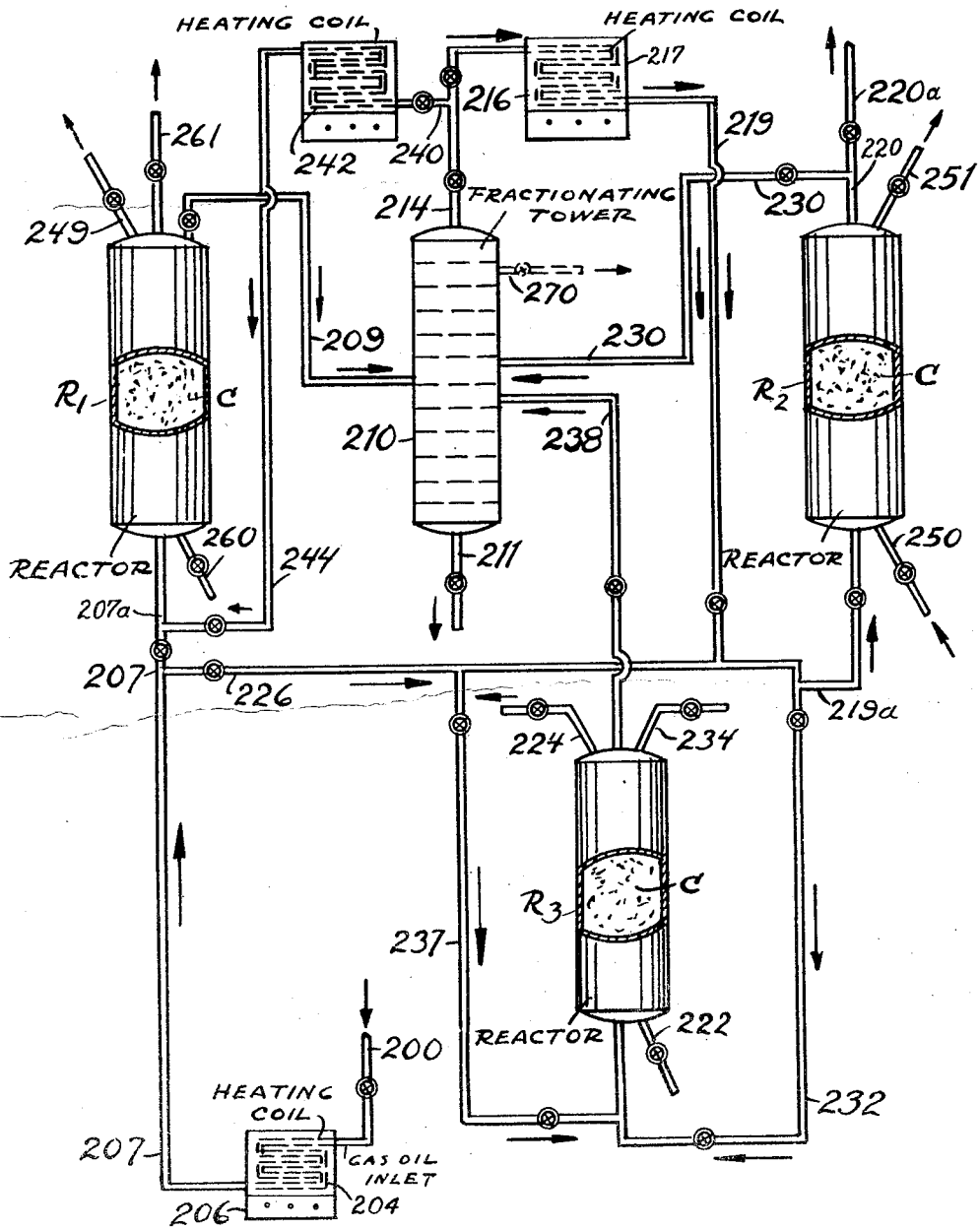

Patented Apr. 15, 1947

2,418,993

UNITED STATES PATENT OFFICE 2,418,993

PROCESS FOR MAKING AN IMPROVED GASOLINE

William J. Sweeney, Summit, N. J., assignor to Standard Oil Development Company, a corporation of Delaware Continuation of application Serial No. 349,434, August 2, 1940. This application December 28, 1944, Serial No. 570,195

2 Claims. (Cl. 196—52)

The present invention relates to improvements in the art of treating hydrocarbons. More particularly, the present invention relates to a method of processing a hydrocarbon oil in order to produce a motor fuel or aviation gasoline of improved octane number and good stability.

This application is a continuation of my copending application Serial Number 349,434, filed August 2, 1940.

It is generally known that cracked gasoline contains appreciable amounts of materials which contribute to instability of the gasoline under severe conditions of temperature and oxidation.

I have discovered a method of overcoming the aforementioned instability of gasoline under severe conditions of temperature and oxidation which it encounters in operation in an automobile and which is often manifested by octane rating "fade." Stated briefly at first, in my process I employ a fresh or regenerated catalyst under certain specified conditions of temperature and time of treatment wherein I effect polymerization of olefins, alkylation of olefins, isomerization of paraffins and hydrostabilization of unsaturates which are present in a catalytically cracked gasoline and in this manner I improve the quality of the gasoline. More specifically, in a preferred procedure, I first crack a gas oil catalytically, using a "once spent" catalyst i. e. a catalyst which has been employed in a prior treatment and then conduct the cracked vapors to a second fractionating zone from which I recover cracked gasoline, normally gaseous hydrocarbons and hydrogen and I conduct these fractions to a zone containing fresh catalyst in which I carry out the aforesaid polymerization of olefins, hydrogenation of olefins, isomerization of paraffins and alkylation of olefins.

As an alternative procedure, I may recover from the second fractionation zone only the gasoline, that is to say, I may separate the gases from the gasoline and treat only the gasoline in the reforming zone.

One object of my invention is to crack, catalytically, a gas oil in the presence of a catalyst which is not unused, newly prepared or regenerated catalyst, but catalyst which has been employed in a prior conversion, and thereafter reform gasoline produced in the cracking operation, in the presence of fresh or regenerated catalyst.

Another object of my invention is to vaporize a hydrocarbon feed stock, such as a gas oil, suspend therein a powdered catalyst which has been used in a prior conversion operation, subject the hydrocarbon containing the catalyst suspended therein to cracking temperatures, separate the cracked vapors from the catalyst, and treat the gasoline fraction in the presence of fresh or regenerated catalyst under light naphtha reforming conditions of temperature and pressure.

Other and further objects of my invention will appear from the disclosures contained in the present specification and claims.

Figure 1B:
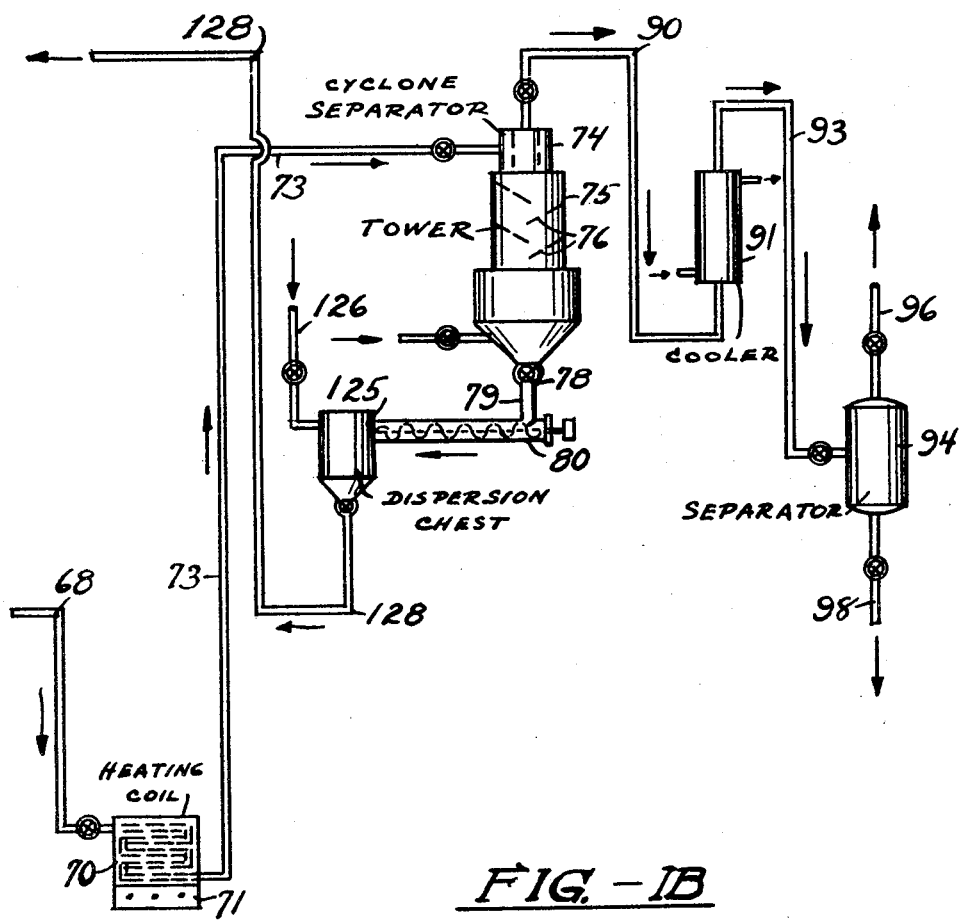

Reference is made at this point to the attached drawing in which Figures 1A and 1B show diagrammatically and in partial vertical section a combination of apparatus elements in which my invention may be performed continuously using powdered catalyst suspended in the reaction vapors during conversion and Figure 2 is a modification thereof employing stationary beds of catalyst to contact reaction vapors.

Referring in detail to Figures 1A and 1B, a charging stock such as an East Texas reduced crude oil having an A. P. I. gravity of about 18° is pumped from line 1 by pump 2 into a coil 3 disposed in a furnace setting 6 where it is heated to about 825° to 850° F. and thereafter discharged into a transfer line 7 in communication with flash tower 8 from which tower high boiling hydrocarbons are withdrawn through line 9 while vapors are withdrawn overhead through line 10 and discharged into an injector 12. At the same time, a powdered catalyst such as an acid treated clay, suspended in steam, nitrogen, carbon dioxide, flue gas, etc., which has been contaminated with carbonaceous or tarry deposits as a result of its use in a light naphtha or gasoline reforming operation, as will more fully and at large appear hereinafter, is withdrawn from conduit 128 and discharged into injector 12 where it admixes with the hydrocarbon vapors. A suspension of hydrocarbon vapors and powdered catalyst is withdrawn from the injector 12 through line 23 and discharged into a cracking coil 28 disposed in a furnace setting 30.

Instead of employing a coil 28, a cylindrical reactor can be employed into which reactor the hydrocarbon gas containing catalyst suspended therein would be injected, and in which reactor the linear velocity of the hydrocarbon gas will be sufficiently slow, say 2 ft. per second, to permit the catalyst to settle out of the vapors and be withdrawn from the bottom of the reactor.

In the cracking coil or reactor 28 the hydrocarbon vapors are subjected to cracking conditions of temperature and pressure and remain in the coil for sufficient period of time to effect the desired conversion of the gas oil to gasoline. The cracked products formed in the coil 28 are withdrawn through line 31 and discharged into a cyclone separator 32 where the catalyst is removed from the vapors and passes by gravity through a tower 33, having disposed therein, a plurality of inclined baffles 34, to a receiving hopper 39. The vapors, on the other hand, are withdrawn from the cyclone separator through a transfer line 45, thence discharged into a cooling coil 46 where the vapors are cooled below the dew point of the gas oil, thence pass via transfer line 49 into a fractionating column or separator 50 where a liquid fraction consisting essentially of unconverted gas oil may be withdrawn from the bottom of the separator through line 51 and, if desired recycled to line 1 to obtain a further portion of cracked gasoline therefrom. Normally gaseous components are withdrawn overhead from separator 50 through line 55, while a vapor fraction comprising substantially the gasoline produced is withdrawn from the separator through line 56, thence passed to an injector 57 where it is admixed with fresh or regenerated catalyst. Alternatively both the gasoline vapors and the normally gaseous fractions are withdrawn through conduit 55 and together discharged into injector 57. The fresh or regenerated catalyst contained in 59 is delivered to injector 57 by discharging it from the hopper through star feeder 60 into screw conveyor 62 which latter discharges the catalyst into the chest 63, while steam or the like, discharges through line 65 in the chest 63 forming therein an entrainment of catalyst in steam or the like, which entrainment or suspension is then discharged into the injector 57 forming a new suspension now containing cracked gasoline vapors. The cracked gasoline containing the catalyst suspended is transferred by means of conduit 68 to a coil 70 disposed in a furnace setting 71 in which coil the gasoline vapors are subjected to proper conditions of time, temperature and pressure in the coil to effect the desired reforming operation which operation serves to hydrogenate and polymerize the olefins present as well as to cause isomerization of paraffins and alkylation of olefins by isoparaffins. Following the reforming operation, the vapors are withdrawn through transfer line 73 and discharged into cyclone separator 74 where the catalyst is separated from the vapors and passes by gravity through a tower 75 having inclined baffles 76, thence is discharged through star feeder 78 and conduit 79 into a screw conveyor 80. Meanwhile the vapors are withdrawn overhead from the cyclone separator 74 through transfer line 90 and conducted to a cooler 91 and from the cooler they are transferred through line 93 to a separator drum 94, where the normally gaseous material is taken off overhead through line 96, while the liquefied reformed gasoline is withdrawn through line 98 as a finished product.

Referring back to the tower 33 in which the catalyst employed in the cracking operation is recovered in the hopper 39, the said catalyst is discharged from the said hopper through a star feeder 100 into a screw conveyor 101, thence into a dispersion chest 103 where it is suspended in an oxidizing gas such as air, or air diluted with steam, flue gas, nitrogen, carbon dioxide, and the like. The oxidizing gas is admitted to the chest or chamber through pipe 104. The dispersion or entrainment of catalyst in regeneration gas is discharged from the chamber 103 through line 105 into a coil 106 disposed in a furnace setting 108. Instead of using a coil, a cylindrical reactor may be employed in which reactor the linear velocity of the oxidizing gas containing catalyst suspended therein may be sufficiently slow, say 2 ft. per second, to permit the catalyst to separate slowly by gravity and to be withdrawn from the bottom of the said reactor. The catalyst in the coil or reactor is regenerated by combustion of the tarry and carbonaceous deposits contained thereon, and is thence withdrawn from the furnace through line 110 and discharged into a cyclone separator 111 where the catalyst is removed from the regeneration gas and passes by gravity into tower 59 carrying inclined baffles 112. The regeneration gas is withdrawn overhead through line 114 and the energy content of these gases may be recovered in part by passing them through a waste heat boiler or permitting them to expand in a turbine engine. Also, the regeneration gas may be used to dilute the air discharged into chamber 103 through line 104. In an operation of this kind, it is necessary periodically to replenish the supply of catalyst with fresh or make-up catalyst, and in the present system means are provided for introducing catalyst into tower 59 through inlet 120.

Referring now to the catalyst recovered from the reforming operation in tower 75, the same as indicated, is discharged into screw conveyor 80. From the screw conveyor it is passed into a dispersion chest 125 where it is suspended or entrained in steam or other gas admitted to the chamber through line 126, and from there the dispersion is conducted through conduit 128 to injector 12 for use without regeneration in the cracking phase as indicated.

In order to give a concrete example illustrating my process, the following operating conditions are set forth with the understanding that my invention is not limited to the precise details set forth therein. Operating on a charging stock comprising a gas oil having an A. P. I. gravity of about 25° good results are obtained in the cracking phase by using a catalyst having a particle size of about 200 to 400 mesh and employing a catalyst to oil ratio of 5 parts of catalyst to 1 part of oil by weight. In cracking coil 3, a temperature of 750° F. to 950° F., depending on the activity of the catalyst used, and a pressure of about 10 lbs. per square inch gauge give satisfactory results. I have found that in the reforming operation satisfactory results are obtained by employing 3 to 4 parts by weight of catalyst to 1 part of oil, employing a temperature somewhat lower than that in the cracking zone, say 650° F. to 850° F., and operating under a pressure of about 20 lbs. per square inch gauge. The regeneration of the catalyst is carried out in coil 106 preferably under a back pressure of about 2 atmospheres gauge, and the oxygen content of the regeneration gas is preferably about 2% to 20%. In any event, the conditions of pressure and oxygen concentration are controlled to prevent the catalyst from attaining a temperature in substantial excess of 1150° F.

Under the conditions specified, about 40% of the gas oil charged to the system is converted to gasoline and this gasoline has a relatively high octane number and a minimum amount of gum-forming constituents. For instance, I may produce a gasoline from an East Texas gas oil under the conditions specified having an octane number of about 80 to 95 according to the rating determined by the Committee on Fuel Research method. Of course, the recycled oil will not produce as much gasoline from a given amount thereof as an original virgin gas oil, as the number of its passages through the cracking coil increases, and therefore the liquid product withdrawn through line 51 into separator 50 may periodically be withdrawn from the system and conveyed to a receptacle as a source of fuel oil.

It may be said that the following range of conditions give good results:

Cracking

| | |
|---|---|
| Temperature | 800° F.–950° F. |
| Pressure | 1–10 atmospheres gauge |
| Time resident in cracking coil | 2–200 seconds |
| Catalyst size | 200–400 mesh |
| Catalyst to oil weight ratio | .5–1 to 10–1 catalyst to oil |

Reforming

| | |
|---|---|
| Temperature | 400° F.–850° F. |
| Pressure | 1–50 atmospheres gauge |
| Time resident in reforming coil | 2–50 seconds |
| Catalyst to oil weight ratio | .5–1 to 10–1 catalyst to oil |

Regeneration

| | |
|---|---|
| Temperature | 800° F.–1100° F. |
| Pressure | 1–3 atmospheres gauge |
| Time resident in regeneration coil | 2–200 seconds |
| Concentration of oxygen in regeneration gas | 2%–20% |

As an alternative procedure, I may conduct my process employing a stationary bed or beds of catalyst. Such a process will now be described in connection with the modification illustrated in Fig. II. As will presently appear, in order to maintain continuity of operation, it is necessary to use three reactors containing catalyst so that one may be undergoing regeneration while the other two are in onstream operation, that is to say, one of the two reactors is employed in the cracking operation while the other is employed in reforming the gasoline produced in the cracking operation. In the drawing, the reactors are designated by reference characters R—1, R—2 and R—3. These reactors contain a catalyst C which may be disposed in the three reactors in the form of one continuous bed, but preferably the catalyst is disposed on trays, spaced apart, the trays having foraminous bases to permit the flow of oil vapors therethrough.

An operation will now be described assuming that reactor R—1 is employed to crack gas oil, while R—2 is employed to reform the gasoline produced in reactor R—1. During this assumed period, the catalyst in R—3 is undergoing purging and regeneration. In carrying out this cycle, the gas oil is introduced into the system through line 200, thence discharged into coil 204 disposed in a furnace setting 206, where the oil is heated to reaction temperatures, say a temperature of about 825° F., whereupon it is withdrawn from the furnace through line 207 and then discharged into the bottom of reactor R—1 which contains once-spent catalyst, that is to say, catalyst which has been used in an operation of reforming gasoline for a period of about say 20 minutes. The gas oil vapors pass upwardly through the catalyst disposed in the reactor R—1, and the total product is withdrawn from the reactor through line 209, thence is discharged into a fractionating column 210 from which the higher boiling constituents and unconverted oil are withdrawn from the bottom of the fractionator through line 211. The vapor fraction is withdrawn from the fractionator through line 214 and then, if necessary, passed through a second heating coil 216 disposed in a furnace 217 where the gasoline is heated to reforming temperatures whereupon the vapors are withdrawn from furnace through lines 219 and 219A thence passed into reactor R—2 containing fresh or regenerated catalyst. The gasoline and normally gaseous materials undergo reaction in reactor R—2 in the presence of a catalyst, the principal reaction being polymerization and hydrogenation of olefins, accompanied by some alkylation, isomerization and cracking. The gasoline thus treated is withdrawn through line 220 as a product to be condensed and stabilized in equipment not shown. Meanwhile, the catalyst in R—3 is undergoing purging and regeneration, the regeneration gas being discharged into the bottom of the reactor R—3 through line 222 and withdrawn through line 224. Prior to the regeneration, steam may be forced into the reactor through line 222 and rejected through line 224, the purpose of the steam being to remove volatile hydrocarbon material. Thereafter, as indicated, the regeneration gas containing free oxygen is forced through the catalyst, the operation being preferably carried out under pressure of say about 45 to 60 lbs. gauge, since this will permit regeneration of the catalyst at lower temperatures, the regeneration gas usually being admitted to the reactor at a temperature of about 600° F. to 800° F. and withdrawn at a temperature of about 1100° F. Following the regeneration, the reactor is again treated with steam or some other inert gas to remove air or oxygen. After the operation of cracking followed by reforming has been conducted for a period of about 20 minutes, in the manner just now explained, during which time the catalyst in reactor R—3 is undergoing regeneration, the same is discontinued and the gas oil heated in furnace 206 is then conducted from line 207 into line 226, thence discharged into line 219, thence into reactor R—2 which now becomes the reactor in which the cracking of the gas oil takes place. As indicated, the catalyst C in reactor R—2 is not regenerated immediately following the discontinuance of the reforming operation previously carried out therein. The gas oil vapors undergo gas oil cracking in the same manner and under the same conditions as explained in the operation of reactor R—1, and thereafter the cracked products are withdrawn through line 220A, discharged into line 230, and thence discharged into tower 210, the heavier hydrocarbons being withdrawn through line 211, while the gasoline and permanent gases or normally gaseous hydrocarbons are withdrawn through line 214, thence discharged into heating coil 216 where they are heated to reaction temperatures, thence discharged into line 219, thence into line 232, thence into the bottom of reactor R—3, where they undergo reforming in the same manner as previously explained in connection with the description of the reforming operation in reactor R—2. The reformed product is recovered through outlet pipe 234 and may be conducted to condensing and stabilizing equipment to produce finished gasoline.

After the operation, which has just now been described, has been continued for about 20 minutes, the process is so manipulated as to remove reactor R—2 from the onstream operation for the purpose of regenerating the catalyst therein, the catalyst in R—1 having undergone regeneration while the cracking operation was proceeding in R—2 and the reforming operation in R—3. In carrying out this cycle, the gas oil heated in furnace 206 is discharged as before into line 207, thence into line 226, thence into line 231, thence into line 232, and thence into the reactor R—3 which contains the once-spent catalyst, that is to say, the catalyst which has just been removed from the reforming operation. The gas oil is subjected to the same cracking conditions as previously, in reactors R—1 and R—2, whereupon the cracked products are withdrawn through line 238, thence discharged into fractionating column 210 from which the unconverted gas oil is discharged through line 211. The gasoline and normally gaseous materials are withdrawn through line 214, thence discharged into a conduit 240, thence into a furnace 242 where they are heated to reforming temperatures, thence discharged into line 244, thence discharged into line 207A and finally discharged into reactor R—1 containing the freshly regenerated catalyst. The gasoline vapors undergo reforming and are recovered from the reactor R—1 through line 249, from which they may be sent to condensing and stabilizing equipment not shown. After this last described operation has continued for a period of about 20 minutes in onstream operation, the entire process set forth above is repeated. During the periods when reactor R—2 is offstream, the catalyst therein is purged by conducting steam or some other gas through line 250 into reactor and withdrawing it through line 251. After suitable purging, the catalyst is regenerated by forcing the regeneration gas through line 250 into the reactor and withdrawing it through line 251, whereupon the catalyst is again purged. In like manner, the fouled catalyst in R—1 is purged and regenerated and again purged, the purging and regenerating gases being forced into the reactor through line 260 and withdrawn through line 261.

It should be pointed out in connection with the operation in the apparatus illustrated in Fig. 2 that a gasoline fraction, substantially free of excess butane and normally gaseous hydrocarbons, may be delivered to the reforming operation. For instance, the gasoline fraction may be taken off from tower 210 at about the level of dashed line 270. This, however, is not the preferred procedure. In operating in the manner illustrated in Fig. 2, I have found that good results are obtained by carrying out a cycle of operations, in which any given reactor is employed for reforming for a period of 20 minutes, thence employed for a 20-minute period as a cracking reactor, and finally undergoes regeneration and purging for a period of 20 minutes.

It is my intention to include in the appended claims not only the precise details set forth above, but also all modifications thereof falling within the spirit of the said invention.

The invention claimed is:

1. A continuous method for the production of gasoline of high octane number and low degree of unsaturation which comprises vaporizing a gas oil, adding a powdered cracking catalyst to said vapors to form suspension of catalyst in said vapors, passing said suspension through a first cracking zone at a temperature between 800° and 950° F., separating the catalyst from the cracked products and regenerating the same, fractionating the said products to recover a gasoline fraction, adding said regenerated catalyst to said gasoline fraction to produce a suspension of said catalyst in said vapors, passing said suspension through a second cracking zone at a temperature up to 850° F., removing a suspension of catalyst in cracked products from said cracking zone, separating the catalyst from said cracked products and mixing the same without regeneration with the gas oil fed to said first cracking zone as the sole cracking catalyst used therein.

2. A continuous method for the production of gasoline of high octane number and low degree of unsaturation which comprises vaporizing a gas oil, adding a powdered cracking catalyst to said vapors to form a suspension of catalyst in said vapors, passing said suspension through a first cracking zone at a temperature between 800° and 950° F., separating the catalyst from the cracked products and regenerating the same, fractionating the said products to recover a gasoline fraction, adding a more active catalyst than that employed in the said first zone but one of the same composition, to said gasoline fraction to produce a suspension of said catalyst in said vapors, passing said suspension through a second cracking zone at a temperature up to 850° F., removing a suspension of catalyst in cracked products from said cracking zone, separating the catalyst from said cracked products and mixing the same without regeneration with the gas oil fed to said first cracking zone as the sole cracking catalyst used therein.

WILLIAM J. SWEENEY.

REFERENCES CITED

The following references are of record in the file of this patent:

UNITED STATES PATENTS

| Number | Name | Date |
|---|---|---|
| 2,357,136 | Rubin | Aug. 29, 1944 |
| 2,358,888 | Thomas | Sept. 26, 1944 |
| 2,300,032 | Kassel I | Oct. 27, 1942 |
| 2,300,033 | Kassel II | Oct. 27, 1942 |
| 2,331,231 | Subkow | Feb. 11, 1941 |